Aug. 3, 1965  C. H. STEIN ETAL  3,197,871
SCRIBING INSTRUMENTS
Filed April 20, 1961  7 Sheets-Sheet 1

INVENTOR
CHARLES STEIN
WILLIAM KRAUSE
BY
ATTORNEY + AGENT

Aug. 3, 1965  C. H. STEIN ETAL  3,197,871
SCRIBING INSTRUMENTS
Filed April 20, 1961  7 Sheets-Sheet 2
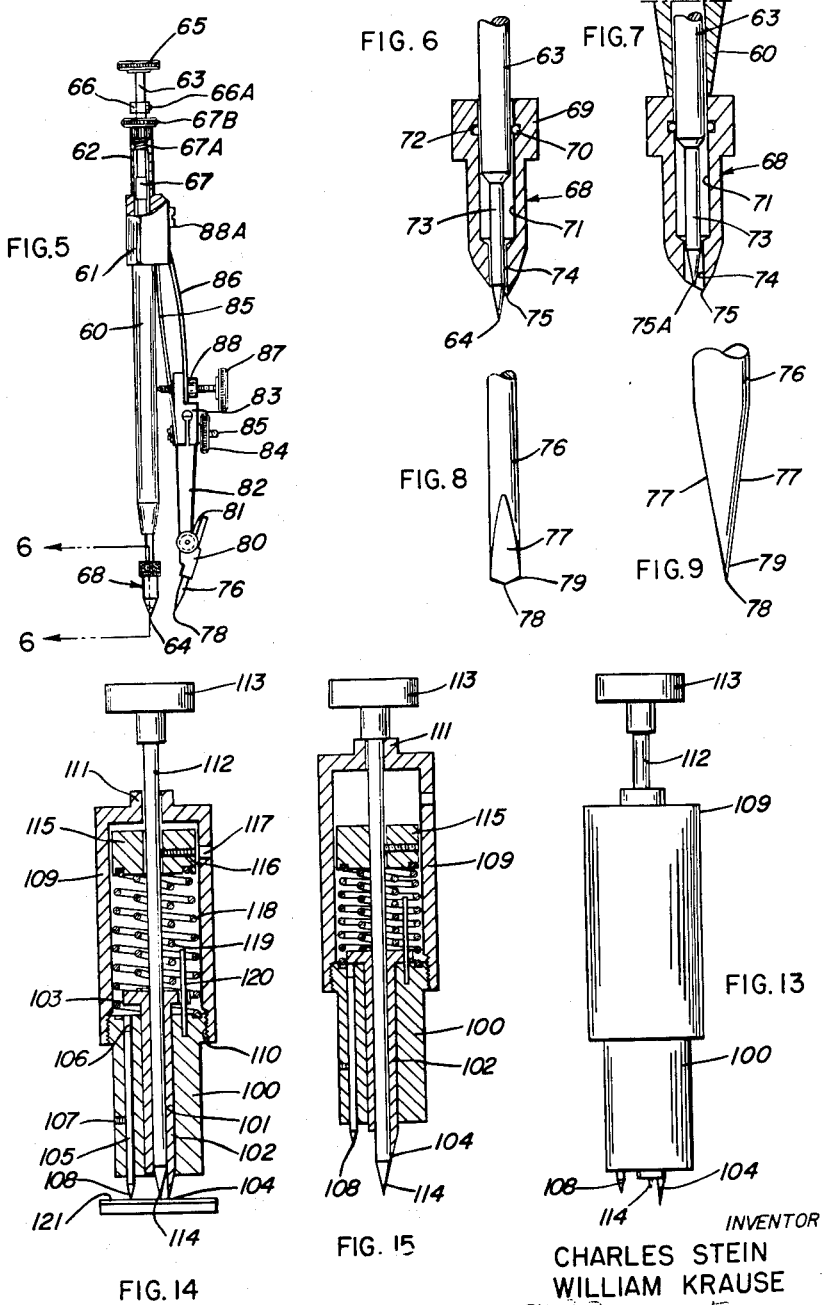
INVENTOR
CHARLES STEIN
WILLIAM KRAUSE
BY
ATTORNEY + AGENT

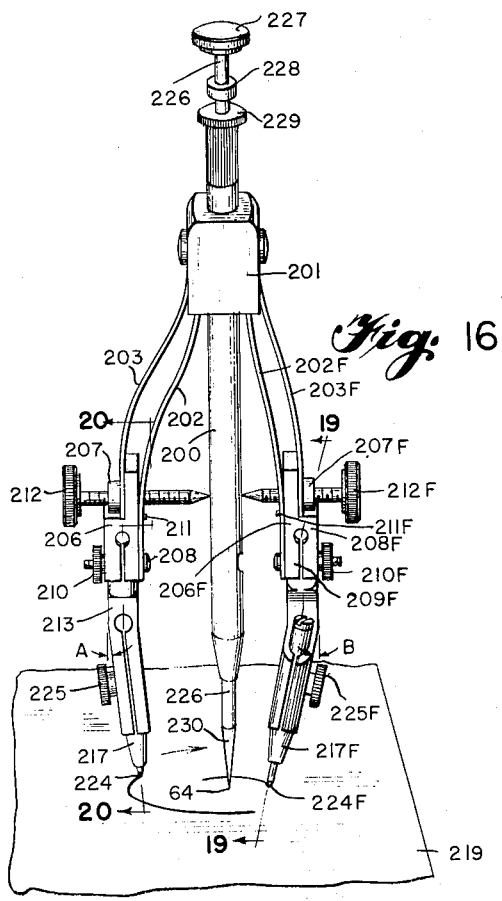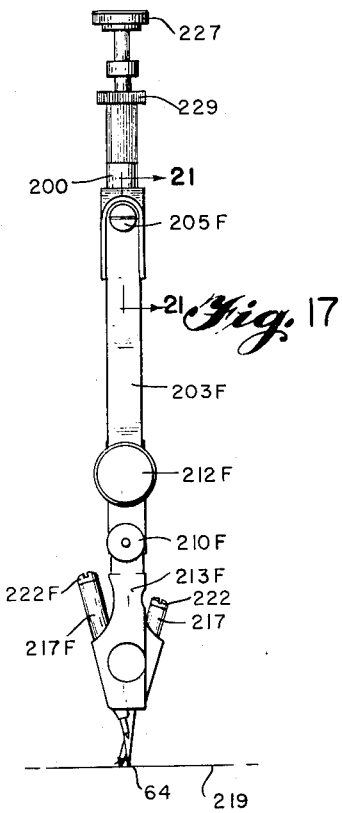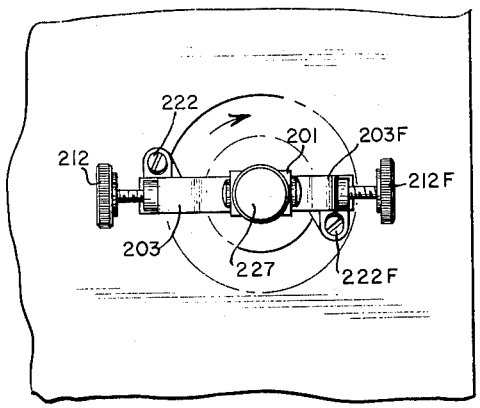

Aug. 3, 1965  C. H. STEIN ETAL  3,197,871
SCRIBING INSTRUMENTS
Filed April 20, 1961  7 Sheets-Sheet 4
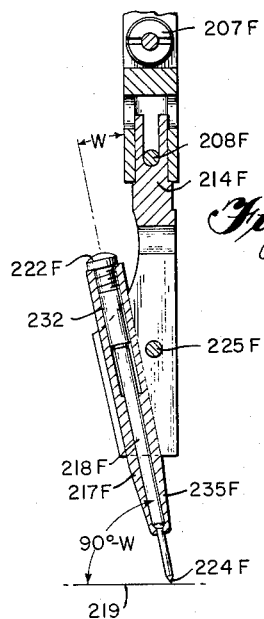
Fig. 19
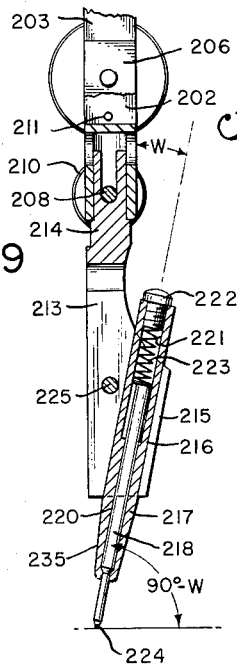
Fig. 20
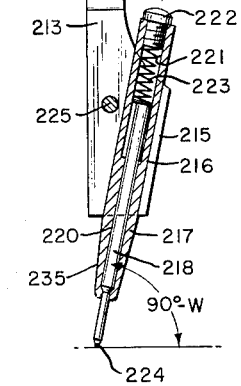
Fig. 21
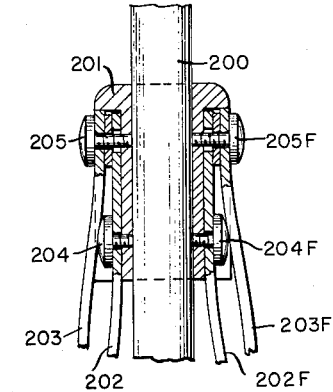
Fig. 24
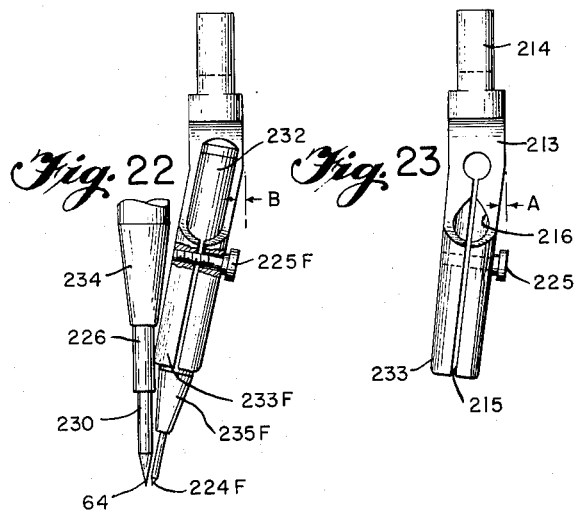
Fig. 22  Fig. 23
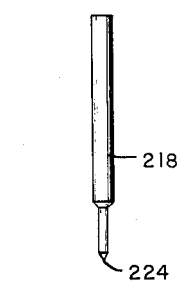
INVENTORS
CHARLES STEIN &
WILLIAM KRAUSE
BY
ATTORNEY

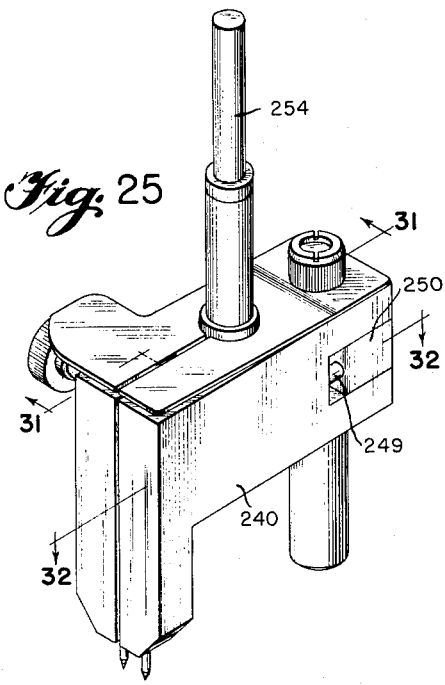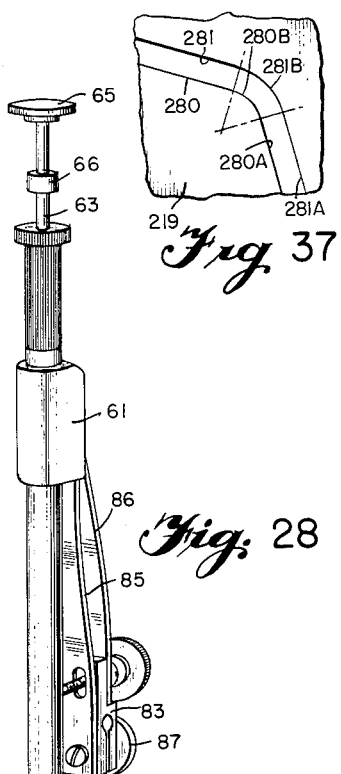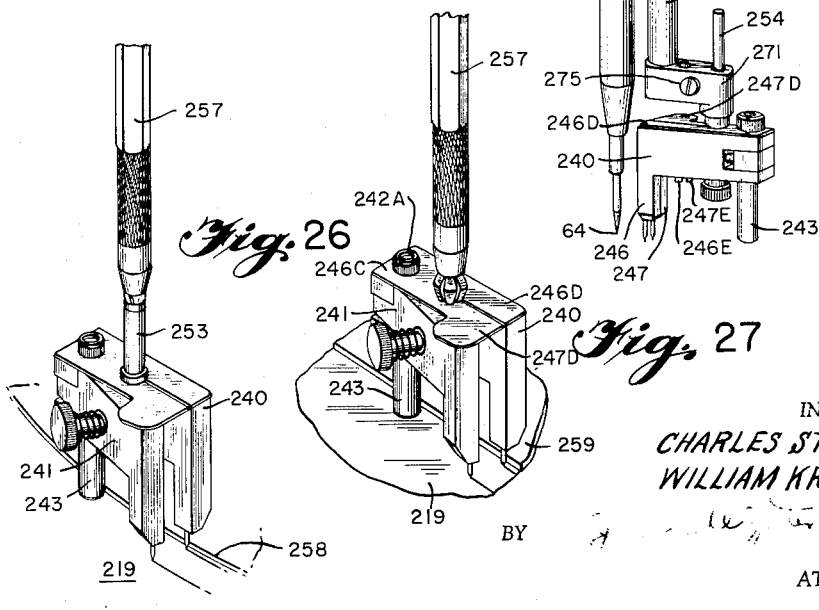

Aug. 3, 1965   C. H. STEIN ETAL   3,197,871
SCRIBING INSTRUMENTS
Filed April 20, 1961   7 Sheets-Sheet 6
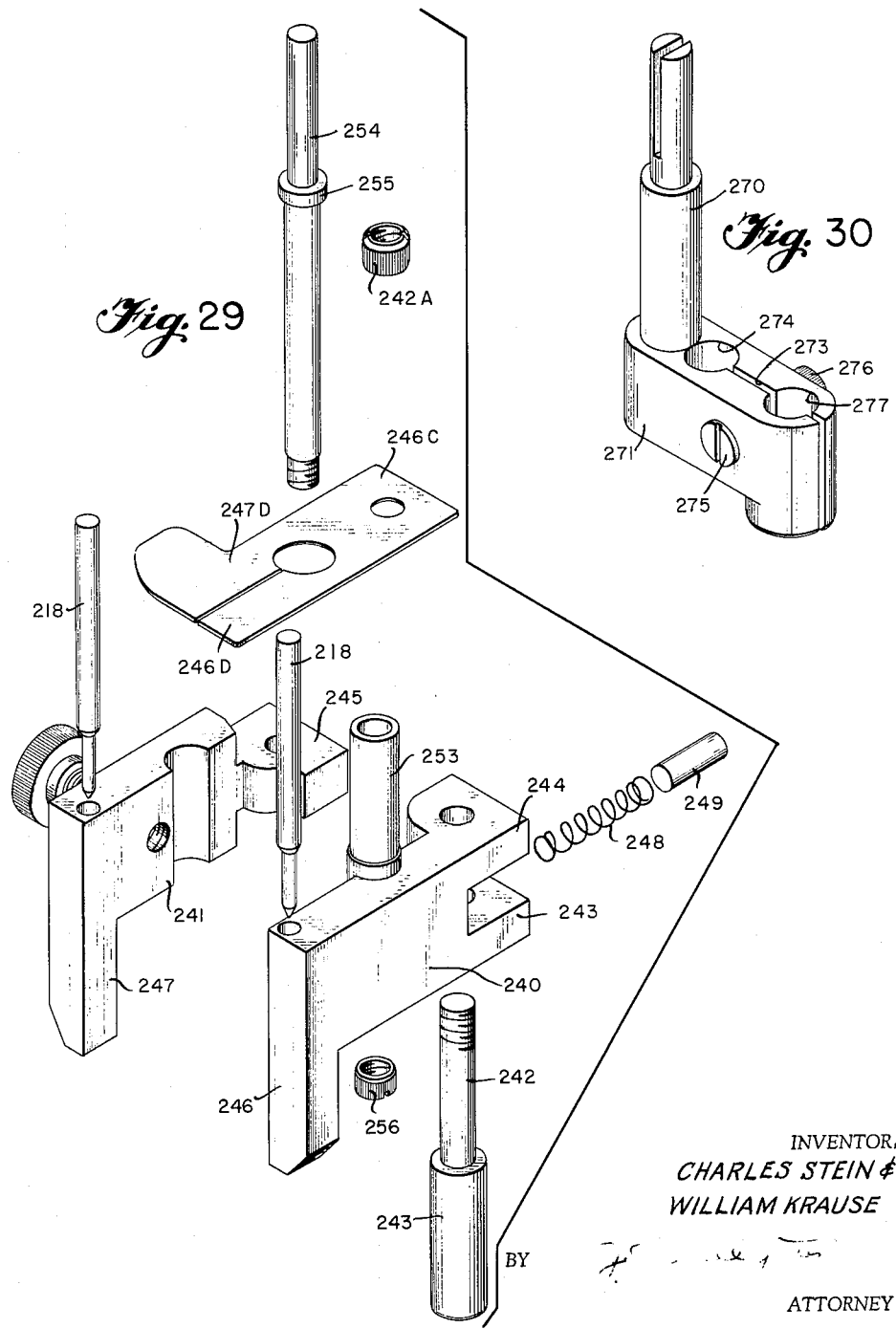
INVENTORS
*CHARLES STEIN &
WILLIAM KRAUSE*
BY
ATTORNEY Aug. 3, 1965   C. H. STEIN ETAL   3,197,871
SCRIBING INSTRUMENTS
Filed April 20, 1961   7 Sheets-Sheet 7
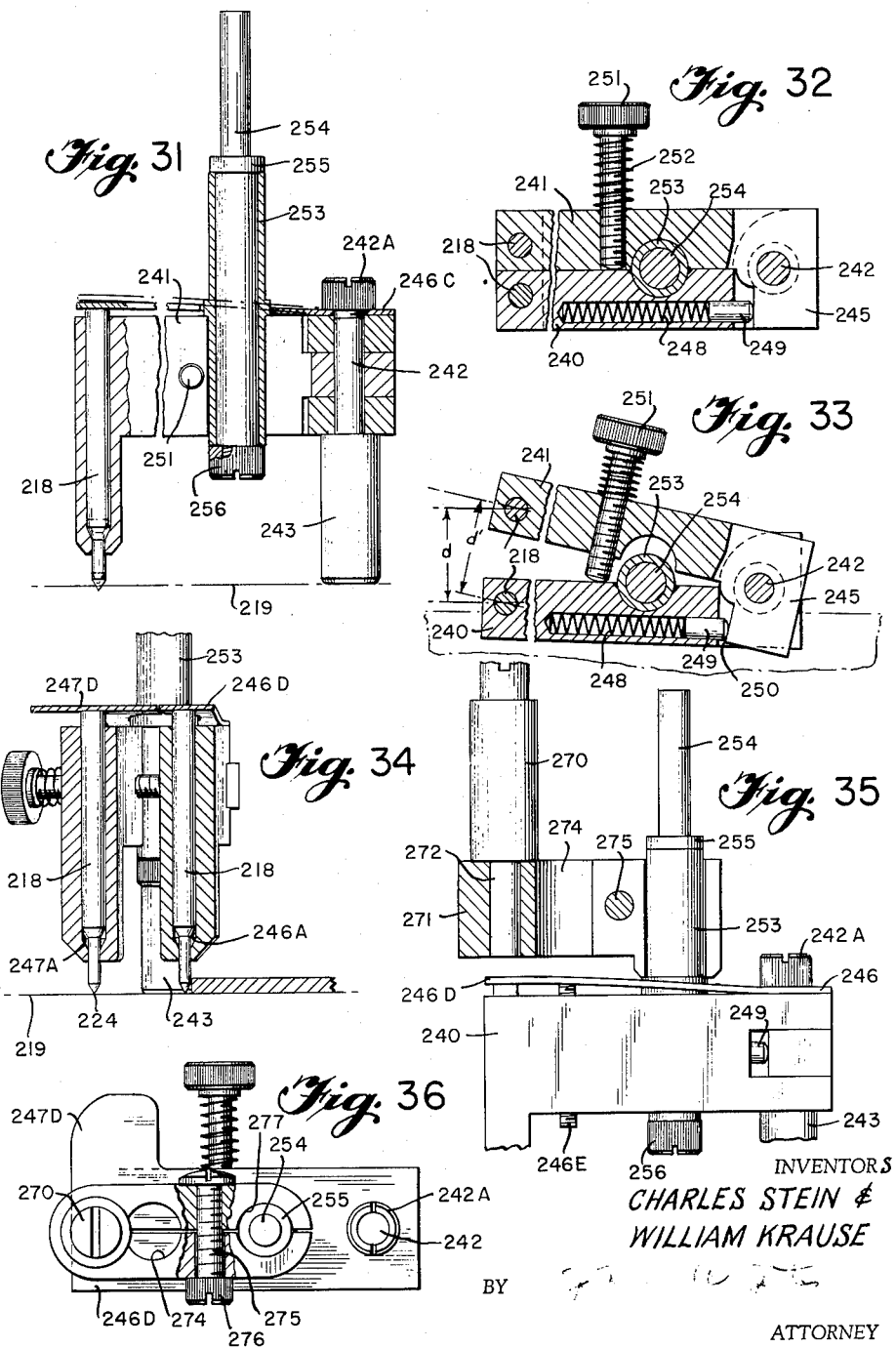
INVENTORS
CHARLES STEIN &
WILLIAM KRAUSE
BY
ATTORNEY

United States Patent Office 3,197,871
Patented Aug. 3, 1965

3,197,871
SCRIBING INSTRUMENTS
Charles H. Stein, Westwood, and William R. Krause, Secaucus, N.J., assignors to Keuffel & Esser Company, Hoboken, N.J., a corporation of New Jersey
Filed Apr. 20, 1961, Ser. No. 104,482
10 Claims. (Cl. 33—18)

The present application is a continuation-in-part of our application Serial Number 817,852, filed June 3, 1959.

The present invention relates to instruments for making master templates for cartography circuit cards and the like where accurate duplications are essential for accurate registry in maps and to obtain constant electrical characteristics in duplicate circuit cards including constant resistance of conductors and constant capacitance between adjacent conductors in each completed circuit card.

Heretofore scribing and cutting instruments of many different designs which usually had a single scribing or cutting edge have been used but the lines and cuts have been coarse and irregular and the edges of the outlined areas have not been parallel and even with a photographic reduction step in the process the reproductions particularly in circuit cards have had objectionable variations in the sizes of the conductors with resulting inaccuracies in the circuits. Also, the previous method of production of a circuit card master with the heretofore known instruments involved many delays.

An object of the present invention is to provide means and method to obtain acurate reproductions in cartography and in circuit cards with a minimum of variation and a minimum of killed personnel.

Another object is to provide scribing and cutting instruments which trace the pattern for circuit cards.

A further object is to provide pattern tracing instruments which can be used to accurately follow straight, concave and convex edge guides.

Another object is to provide instruments for obtaining scribing and/or cutting of two lines in one operation.

Another object is to provide methods of producing accurate masters for graphic arts.

A further object is to provide a method of making a finished circuit card involving a master pattern or template from which the circuit card is duplicated.

Other and further objects will be apparent as the description proceeds and upon reference to the accompanying drawings, wherein:

FIGURE 5 is a front elevation with parts broken away of a circle cutting device in the form of a drop type bow compass with a tubular cutter slidably mounted on the drop center and a chisel type cutter substituted for the circle scribing element.

FIGURE 6 is an enlarged section of the tubular cutter taken substantially on line 6—6 of FIGURE 5 showing the drop center projecting through the tubular cutter.

FIGURE 7 is a similar enlarged section through the tubular cutter and the lower portion of the hollow center of the bow compass with the point of the drop center in normal retracted position in the tubular cutter.

FIGURE 8 is an enlarged side elevation of the chisel type outer circle cutter used as the outer circle cutter in the drop bow compass of FIGURE 5.

FIGURE 9 is a still further enlarged front elevation of the chisel type cutter taken substantially tangential to the path of the outer circle chisel type cutter.

FIGURE 13 is an elevation of a concentric circle scribing device.

FIGURE 14 is a vertical section through the slidable center of the circle scribing device of FIGURE 13 in place on a scribe coated film showing the operative position of the scribing elements with relation to a scribable coating shown on a fragment of film.

FIGURE 15 shows the circle scribing device of FIGURE 13 with the parts held with the scribing elements retracted manually from the center point to facilitate locating the center on a scribe coated film.

FIGURE 16 is a perspective of a scribing type drop center compass with two radially adjustable arms formed of sets of leaf springs supporting adjustable clamps at their outer end with scribing devices and their supports in the clamps for simultaneously scribing two circles or arcs of different radii.

FIGURE 17 is a side elevation of the double arm drop center compass scribing device of FIGURE 16 as seen from the side having the fixed scribing element.

FIGURE 18 is a top plan view of the drop center compass double arm scribing device of FIGS. 16 and 17.

FIGURE 19 is a section taken substantially on line 19—19 of FIGURE 16 showing the fixed scribing point in its cartridge with the cartridge in the cartridge support held in the clamp at the end of one radially adjustable arm of one pair of leaf springs.

FIGURE 20 is a section taken substantially on line 20—20 of FIGURE 16 showing the spring pressed scribing element in its cartridge with the cartridge in the cartridge support held in the clamp on the other radially adjustable arm of the other pair of leaf springs.

FIGURE 21 is a fragmentary section taken substantially on line 21—21 of FIGURE 17 showing the mounting of the two pairs of leaf springs on the mounting block fixed to the tubular center support.

FIGURE 22 is a fragmentary view of the fixed scribing point in its closest relation to the drop center shaft to illustrate the arrangement which prevents physical contact of the scribing point of the scribing element with the drop center and showing the sharp angle of the cartridge support to permit drawing circles of small radius.

FIGURE 23 is a detail of the less sharply angled cartridge support for supporting the cartridge which carries the spring pressed scribing element so that both the fixed and the spring pressed scribing elements may operate simultaneously without excessive force.

FIGURE 24 is an elevation of one of the replaceable scribing elements which is usable in either cartridge.

FIGURE 25 is a perspective of a scribing device including two L-shaped hingedly connected together by corresponding legs so the other legs remain parallel providing for mounting in either a lead holder or in a drop center compass for making parallel lines following a guiding edge or making arcuate lines respectively and providing for accurate connection of straight and arcuate lines.

FIGURE 26 shows the scribing device mounted for pivotal movement with respect to the supporting lead holder.

FIGURE 27 illustrates the mounting of the scribing device of FIGURE 25 in fixed relation to the supporting lead holder.

FIGURE 28 shows the scribing device of FIGURE 25 mounted by means of an adapter on the single arm of a conventional drop center compass so that arcuate lines may be scribed.

FIGURE 29 is an exploded perspective of the scribing device of FIGURE 25.

FIGURE 30 is a perspective of the adapter for mounting the scribing device of FIGURE 25 in a drop center compass.

Figure 1:
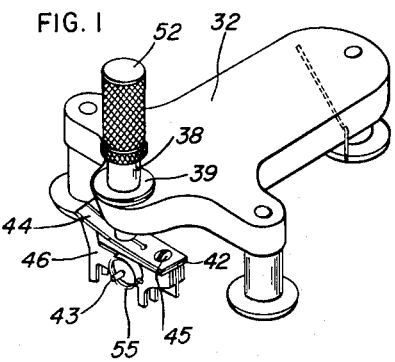
FIGURE 1 is an isometric view of a device for cutting parallel lines through a peelable coat on a dimensionally stable base film which device is adapted to follow straight and curved outlines under free hand guiding or by guiding along a straight or curved edge.

FIGURE 31 is a vertical section taken substantially on broken plane 31—31 of FIGURE 25 showing the hingedly mounted L-shaped body and the scribing point therein and showing the tubular support shank for the main L-shaped body with the shouldered shaft rotatable therein providing for mounting of the scribing device on a lead holder in fixed relation on the tubular supporting shank and in rotatable relation on the rotatable shouldered shaft.

FIGURE 32 is a horizontal section taken substantially on broken plane 32—32 showing the hinge connection by a pivot pin of the first legs of the two L-shaped bodies to maintain the other legs in parallel relation and showing the spring pressed plunger for biasing the bodies together toward their abutting position shown and showing the thumb screw for separating the other legs of the bodies carrying the scribing elements to provide for different distances between the scribed lines.

FIGURE 33 is a section similar to FIGURE 32 showing the scribing points in spaced relation an intermediate distance for scribing more widely spaced lines.

FIGURE 34 is a vertical section through the axes of the scribing elements looking toward the pivot pin and stud extension showing the guiding action of a guiding edge on the scribing point on the main L-shaped body and the guiding action of the stud extension.

FIGURE 35 is a fragmentary elevation with parts in section and parts omitted showing the scribing device of FIGURE 25 mounted in fixed relation on the adapter for mounting on a drop center compass and showing the means to vary the bias of the leaf spring portions to obtain equal scribing action on the scribing points of the scribing elements.

FIGURE 36 is a plan view of the adapter and the scribing screw for connecting the adapter to the tubular shank fixed to the main L-shaped body of the scribing device.

FIGURE 37 is a fragment of a scribe or peel coated material showing two pairs of straight parallel lines drawn by the scribing device shown in FIGURE 25 and also showing connecting arcs drawn between such pairs of straight parallel lines by the same scribing device mounted in a drop center compass.

Referring more particularly to FIGURES 1–4 of the drawing, a device for making parallel cuts in a peelable coated film, having a base sheet 30 of dimensionally stable oriented polyethylene terephthalate and a peelable coating 31, includes a cross-shaped body 32 preferably made of transparent plastic material such as Lucite or the like supported on the film by legs 33 extending downwardly from the ends of the stem and arms of the cross-shaped body or chassis 32. The legs 33 have threaded shanks screwed into the body and have transparent plastic, glass, or metal dome shaped feet 34 retained between reinforcing washers 35 adjacent the ends of the legs 33 and conical projections 36 having slots effectively keying the dome shaped feet 34 to the legs. The bottoms of the dome shaped feet define a reference plane 37 which is coincident with the supporting surface of the peelable coating 31 and such feet provide for movement of the cutting device in all directions on the supporting surface.

An externally threaded outwardly flanged tubular guide 38 is mounted by means of its lower threads in a threaded opening in the head of the cross shaped body 32 so that the axis of the tube 38 is perpendicular to the plane of reference plane 37, the tubular guide 38 being provided with a flange 39 engaging the upper surface of the body 32 to limit the lower position of the tubular guide. A shaft 40 extending completely through the tubular guide 38 is mounted for axial and rotary movement therein. A first mounting plate 41 lying in the axis of shaft 40 is fixed to the lower end thereof. A second mounting plate 42 at the upper edge of the first mounting plate and extending radially from the shaft is fixed to said first plate and shaft providing a solid cutter support or mounting member. A pivot pin 43 spaced from the axis of shaft 40 and extending transversely thereto as clearly shown in FIGURE 2 extends transversely through the mounting plate 41 and is fixedly secured by welding or the like to the plate.

Figure 4:
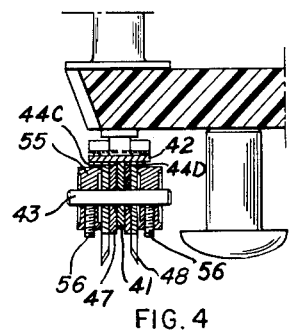
FIGURE 4 is a fragmentary section on the same enlarged scale as FIGURE 3 taken substantially on line 4—4 through a horizontal axis, offset from the spindle axis, supporting the cutting elements.

A leaf spring 44 overlying the second mounting plate 42 is secured by a screw 45 beyond the pivot pin 43 from the axis of the shaft 40, the leaf spring 44 being provided with a slit extending from its free end to adjacent the screw 45 and terminating in an aperture through the spring providing two individual tines for engaging head portions of laterally spaced sofa-shaped scriber cutters 46 which are maintained in spaced relation by spacing elements 47 from the first mounting plate 41, the sofa-shaped cutters 46 and spacing elements 47 being pivotally mounted on the outwardly extending portions of the horizontal pivot pin 43 as clearly shown in FIGURE 4 whereby the sofa-shaped cutters 46 and the spacing elements may pivot about the pivot pin 43 against the tension of the free ends of the tines of leaf spring 44.

Figure 2:
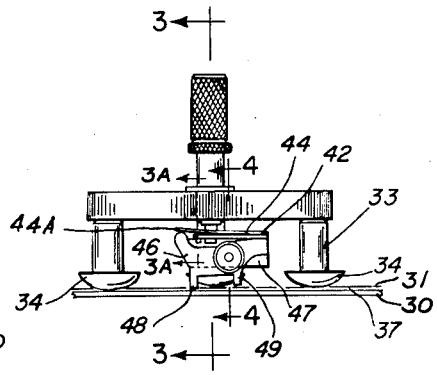
FIGURE 2 is a front elevation of the cutting device.
Figures 3, 3A:
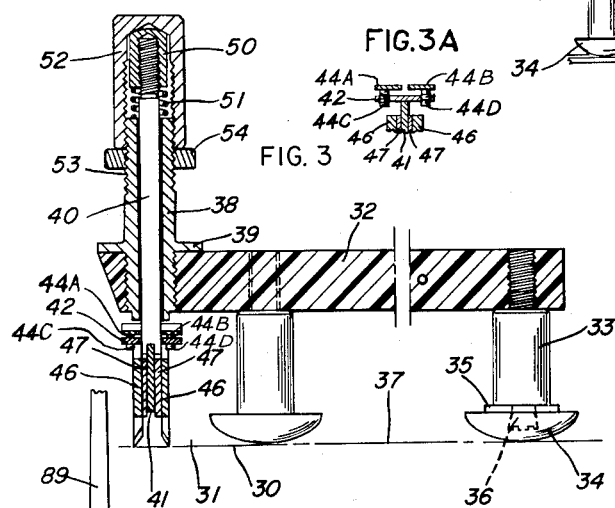
FIGURE 3 is a longitudinal vertical section on an enlarged scale taken substantially on line 3—3 of FIGURE 2, through the vertical axis of the cutter supporting spindle and showing the rear or cutting legs in elevation.
FIGURE 3A is a fragmentary section on the same enlarged scale taken on line 3A—3A of FIG. 2 showing the screw adjustment for controlling the bias of the tines of the spring leaf for controlling the cutting pressure.

The sofa-shaped cutter blades 46 are provided with angled chisel cutting edges 48 formed on the feet at the head end of the sofa-shaped cutters as shown in FIGURE 2. The cutting edges 48 project below the reference plane 37 while the feet 49 at the foot of the sofa-shaped cutters are located above the reference plane 37 defined by the bottoms of the three supporting feet 34 of the cutting device. The vertical positioning of the cutters 46 is determined by the position of the shaft 40, such shaft 40 being provided with a threaded upper end on which a spring retaining cap 50 is threadedly secured retaining a compression spring 51 between the cap 50 and the upper end of the tubular guide 38, the spring 51 surrounding the shaft 40.

The shaft 40 is limited in its upward movement by the engagement of spring retaining cap 50 against an adjustable stop cap 52 which is threaded onto the upper threads 53 of the tubular guide 38 whereby the position of the cutting edges 48 can be accurately located with relation to reference plane 37, the adjusted position of the stop cap 52 being fixed by the knurled nut 54 whereby an operator of the cutter can accurately control and predetermine the position of the cutting edges 48. The individual tine leaves of a yieldable means in the form of a leaf spring 44 engage the corresponding heads of the sofa-shaped cutters 46 and the heads of spacing elements 47 providing a normal bias determined by the dimensions of the leaf spring on the scribing cutting edge portions 48 in accordance with the strength of the leaf spring 44. The downward pivotal movement of the cutting edges 48 about pivot pin 43 is limited by the abutment of the foot portion of the sofa-shaped cutters with the horizontal mounting plate 42, the normal bias of the leaf spring 44 being such as to produce the desired cutting action by properly sharpened cutting edges 48 in the peel coat 31 of the dimensionally stable polyethylene terephthalate base. In use the tines 44A–44B of leaf spring 44 may vary and the sharpness of cutting edges 48 may vary and to compensate for such variations Allen head screws 44C, 44D are threaded through plate 42 and by proper adjustment may engage tines 44A, 44B respectively so that the effective cutting force on cutting edges 48 on the peel coat 31 will produce substantially identical cutting actions regardless of variations in manufacture or variations resulting from use.

In use the parallel line cutting device can be used to follow a free hand outline since the cutting blades 48 are located to trail with respect to the axis of shaft 40. The cutting blades can be guided by a straight or curved edge against which the legs at the head and at the foot of the sofa-shaped cutter may slidingly abut simultaneously thereby making it possible to accurately guide the cutting edges 48 along a straight or curved edge whereby the device is useful in all types of cutting. The foot leg 49 of each sofa-shaped cutter serves as a guide projection to engage a guide edge 27 shown at 259 in FIG. 27 or 258 in FIG. 26. It will be evident that the number of spacers 47 and the thickness thereof may be varied to control the space between the cutting edges 48 of the cutters, the spacers 47 providing a large area of contact to maintain the parallel relation. The cutters 46 and spacers 47 are held in operative position on pivot pin 43 by collars 55 having Allen head set screws 56 threaded in radial bores in the collars and clamped against the pin 43.

The cutting device of FIGS. 1 to 4 may be provided with a single sofa-shaped cutter element and the first plate and cutter element so positioned that the cutting edge 48 will be radial to the perpendicular axis. This may be done by mounting the plate 41 offset to the perpendicular axis or by providing an offset in the cutter element.

Referring more particularly to FIGURES 5–9 of the drawings, a circular peel coat cutting device to produce concentric slits in a peelable coating includes a drop center type of compass. The drop center compass includes a tubular sleeve 60 extending downwardly from a mounting block 61 with an internally threaded tubular extension 62 projecting upwardly from the mounting block 61. A center rod 63 extends through the tube 60, block 61 and extension 62 having a sharpened projecting point center 64 at one end and a finger engaging knurled knob 65 at the other end. An adjustable stop 66 in the form of a collar with a set screw 66A limits the downward movement of the center rod 63 against a tubular abutment sleeve 67A removably secured by threaded engagement in the upper threaded end of extension 62. A knurled flange 67B provides for removal of threaded abutment sleeve 67A and also serves as an additional means to rotate the instrument. A tubular stop 67 located in the tubular extension 62 is fixed to the center rod 63 by any suitable means such as shrinking thereon and limits the upward movement of the center rod while permitting disassembly. Adjustment of the stop 67 can be obtained by reversing the shrinking process and changing the position of stop 67 or by a strong force in a press or the like.

A tubular cutter 68 is provided with an upper knurled portion 69 having an annular internal groove 70 communicating with the major bore 71 and such annular groove 70 receives a split resilient ring 72 adapted to yieldably and frictionally grip the center rod 63 and maintain the tubular cutter 68 in position on the rod 63. The lower end of the rod 63 is reduced in diameter in the portion 73 and a cooperating reduced bore 74 in the tubular cutter 68 maintains the tubular cutter in radial position with respect to the center rod 63. The lower end of the tubular cutter 68 is provided with a sharpened edge 75 which may be obtained by providing a conical end on the tubular cutter 68 and then sharpening the conical end of cutter 68 in the form of a flattened cone having its axis 75A askew to the axis of the tubular cutter 68 thereby producing the cutting edge 76 substantially tangent to a circuit of the radius between center point 64 of the rod and the cutting edge 75, the lowest point of the cutting edge doing the actual cutting.

It will be noted that the stop 67 is so arranged that it will engage the lower end of the threaded sleeve 67A in such a position that the upper end of the tubular cutter 68 (FIG. 7) will engage the lower end of the tube 60 to locate the center point 64 of the rod 63 just above the lowest point of the cutting edge 75 of the tubular cutter 68 when center rod is raised to its maximum withdrawn position. It will also be evident that the tubular cutter 68 is kept in guiding relation by the bore 71 and split ring 72 engaging rod 63 and by the reduced bore 74 engaging the reduced portion 73 of the center rod. Rotation of the rod 63 by means of the knob 65 will cause the tubular cutter 68 to rotate while the center point 64 of the rod maintains the rod on the selected center on the work and the cutting edge 75 makes a small circular cut in the peelable coating. The split ring is of such shape as to cause frictional and resilient engagement between rod 64, spring 72 and groove 70. It will also be evident that the center rod 63 may be held with the center point 64 at the selected center of the work such as at the location of a circuit pad and the tubular cutter 68 rotated by engagement of a person's thumb and finger with the upper enlarged knurled portion 69 of the tubular cutter.

The outer circle of the circuit pad is slit by a chisel type cutter 76 having a generally chisel shaped cutting extremity formed by the dihedral surfaces 77 which converge at a cutting edge or point 78 and such cutting point 78 is defined by the intersection of two pairs of dihedral surfaces 79 with the lines defined by each pair of dihedral surfaces 79 intersecting at the cutting edge or point 78.

This chisel type cutter 76 is secured in the usual pencil lead clamp 80 by means of an adjusting clamp screw 81 mounted on a stem 82 secured in a socket in a block 83 by means of a nut 84 threaded onto a stud 85 which stud also secures the block 83 to one leaf spring 85 secured to the main block 61 by a screw (not shown). Another leaf spring 86 secured to the main block 61 by a screw 88A and to the pen or pencil attaching block 83 serves to maintain the pencil receiving block 83 in generally parallel relation to maintain the cutter 76 in substantially parallel relation to its initial cutting position to assure uniform cutting action. The adjustment between the center point 64 and the cutting point 78 is obtained by a knurl head radial adjustment screw 87 threaded into an externally and internally threaded flanged tubular nut 88 which nut 88 secures one end of the leaf spring 86 to the pen and pencil receiving block 83, the other end of the leaf 86 being secured in position by the screw 88A and the upper end of the spring 85 being secured by a suitable machine screw threaded into the block 61 (not shown).

In use the concentric circle circuit pad slitting device of FIGURES 5–9, inclusive, may be adjusted to the external radius of the pad by the setting of the distance between center point 64 and chisel-like cutting point 78 and the rod 63 withdrawn to its uppermost position as shown in FIGURE 7 to locate the point 64 within the bore 74 and spaced upwardly from the cutting point 75. The concentric circle slitting device is located with the cutting point 75 in its correct position on the peelable coat 31 with the rod 63 perpendicular. Pressure is applied downwardly on knob 65 causing center point 64 to penetrate the peel coat and such pressure is transferred to tubular cutter 68 through spring 72 and by rotation of the rod 63 by means of knob 65 the cutting edge 75 is moved through at least 360° to make a complete cut while the center point 64 is retained in position. The friction and resiliency of the split ring 72 provides a clamping action between the rod 63 and the tubular cutter 68 maintaining sufficient downward force on the cutting point 75 to produce the necessary cutting of the center circle.

Thereafter the rod 63 is maintained in a perpendicular position by one hand and the operator rotates the adjustable arm of the device by engagement with the knurled portion of tubular extension 62 and/or tubular stop screw 67A with sufficient downward force on the cutting point 78 to obtain a cutting action and after a complete rotation at the required cutting pressure the circuit pad is outlined with a slit extending completely through the peelable coat. It will be understood that the slitting of the peelable coat 31 with cutter 76 through cutting point 78 may be discontinuous through the peelable coat so that the portion of the peelable coat corresponding to the circuit pad adjacent to the portion of the peelable coat corresponding to the conductive lead may remain connected to permit peeling of the entire circuit pad and conductive lead in one operation.

Figures 10, 11:
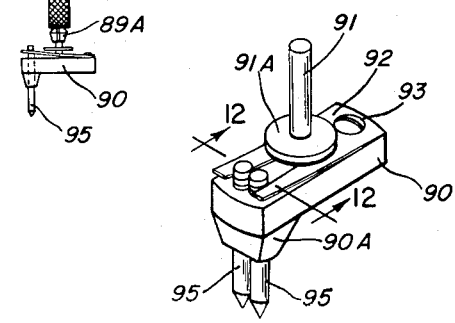
FIGURE 10 is a side elevation of a device for scribing parallel lines and mounted in the jaws of a clutch pencil type holder shown fragmentarily.
FIGURE 11 is an enlarged isometric view of the parallel line scribing device of FIGURE 10 showing the spring by which uniform pressure is obtained on the scribing points and showing the flange for limiting the insertion of the supporting stem in a clutch type pencil holder.
Figure 12:
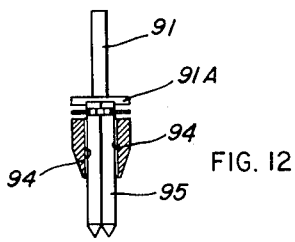
FIGURE 12 is a transverse section taken substantially on line 12—12 of FIGURE 11 showing the close positioning of the scribing points.

Referring more particularly to FIGURES 10–12, inclusive, a scriber particularly useful in scribing parallel lines in a scribe coating on a dimensionally stabilized polyethylene terephthalate film is shown applied to a conventional pencil or pen type holder 89 having clutch jaws 89A. The scribing tool comprises a body 90 preferably formed of metal or the like having an upwardly extending shank 91 fixed thereto, said shank carrying flange 91A, the shank 91 being adapted for reception in the lead gripping jaws 89A of the holder, the flange 91A limiting the insertion thereof. A leaf spring 92 is secured to one end of the body 90 by a screw 93 threaded into the body 90, the spring 92 having tine leaves projecting from the other end thereof. Scribing point receiving bores 94 extend through the other end of the body 90 and through a downwardly extending enlargement 90A, the scribing points 95 and the bores 94 being cylindrical in section. The lower or scribing ends of the scribing points 95 are conically pointed to the desired sharpness to obtain the proper width of line, the upper end of each scribing point 95 being provided with a transverse chord groove 95A which receives the inner edge of the associated tine of the leaf spring. The resilient pressure on scribing points 95 is obtained by the selection of spring 92 and such spring permits one point 95 to be moved upwardly so that in the event that the holder 89 and the scribing points are not held exactly perpendicular to the work both points will scribe uniform lines. The spacing of flange 91A from body 90 provides clearance for the spring permitting the free movement of the tines without binding.

Referring to FIGURES 13 to 15, inclusive, a concentric circle scribing device is shown to include a vertically disposed cylindrical body 100 having an axial bore 101 extending therethrough and receiving a tubular cutter 102 having a flange 103 at its upper end and a cutting edge 104 at its lower end, said tubular cutter being of great length than the body to project from both ends thereof. An elongated cutter 105 is vertically adjustably mounted in a vertically extending opening 106 and secured in adjusted position by a set screw 107 so that the lower sharpened end 108 will extend downwardly beyond the lower end of body 100. An open bottom cylindrical cap 109 provided with internal threads at its open end is received on external threads 110 on an enlargement at the upper end of the body 100, the upper end of the cap 109 being closed and provided with a boss 111 having an axial bore therethrough in alignment with and of the diameter of the central bore of the tubular cutter 102, the bores of said boss 111 and of said tubular cutter 102 receiving a center shaft 112 for relative axial and rotatable movement. The center shaft 112 is provided with a finger engaging knurled knob 113 at its upper end and with a sharpened conical point 114 at its lower end. An abutment plate 115 is positioned within the cap 109 and has a passage receiving the center shaft 112 and is secured to such center shaft by a set screw 116 to prevent relative axial movement between the abutment plate 115 and the shaft 112. An aperture 117 is provided in the side of the cap 109 to provide access to the set screw 116. A first compression spring 118 positioned within the cap 109 has its upper end received in a groove in the abutment plate 115 and its lower end received in a groove in the upper end of the body 100 whereby the abutment plate 115 with the center shaft 112 is normally urged upwardly to a position in which the cutting point 114 lies above the normal position of the cutting points 104 and 108. A second compression spring 119 surrounding the center shaft 112 abuts the flange 103 of the center tubular cutter 102 and the abutment plate 115 thereby normally urging the tubular cutter 102 to its projected position shown in FIG. 15. A keying pin 120 fixed in an upwardly opening aperture in the body 100 extends through an enlarged aperture in the flange 103 preventing relative rotation of the tubular cutter 101 with respect to the body 100 while permitting relative axial movement.

In use the circular scribing device of FIGURES 13 to 15 is manipulated by the operator so that the cap 109 is drawn upwardly on center shaft 112 so the boss 111 abuts the hub of the knob 113 thereby causing the point 114 of the device to project beyond the scribing points of cutters 104 and 108 so that operator can accurately locate the center 114 about which the circles are to be scribed and after the point is located the operator releases the cap 109 and such cap 109 with the body 100 moves toward the material to be scribed as shown in FIGURE 13 until the scribing point 108 engages the surface 121 to be scribed. The tubular scribing device 102 is also urged downwardly by the action of the spring 119 so that scribing point 104 engages the surface 121 to be scribed, the operator applying sufficient downward pressure on the knob 113 to maintain the center point on the center about which the circles are to be scribed and the scribing points 108 and 104 will remain in contact with the surface 121 due to the spring pressure and then the operator rotates the scribing device by engagement of the fingers with the knurled surface of the cap 109 and concentric circles are scribed by the points 104 and 108.

It will be evident from observing the position of the parts in FIGURE 14 that the cutting point 104 can be made to engage the surface prior to the engagement of the surface by cutting point 108 and a complete circle may be made by the inner cutter if the operator takes care to prevent the cutter 108 from contacting the work and a partial circle may be drawn with the outer cutter 108 if desired to avoid crossing scribed lines such as at locations where circuit pad outlines join conductor lead outlines.

Referring more particularly to FIGURES 16 to 24, a scribing device for simultaneously making two circles of different diameters such as for circuit pads includes a drop center type compass. The compass includes a tubular center support 200 on which a mounting block 201 is fixedly secured adjacent to and spaced from one end, the other end being externally tapered, a stud receiving recess being provided intermediate the ends for receiving the head of a clamp screw. A first radial arm includes a pair of leaf springs 202, 203 secured by suitable screws 204, 205 which pass through apertures in the leaf springs and are threaded into threaded openings in the mounting block 201. The outer ends of the leaf springs are secured to a clamp member 206 which is secured to the outer end of leaf spring 203 by a shouldered and externally and internally threaded sleeve 207 passing through aligned apertures and threaded into an upstanding portion of the clamp 206 with the shoulder abutting the leaf spring 203. The outer end of the clamp 206 is provided with a bore for receiving the shank of a cartridge and such bore includes diametrically opposite cutaway portion to provide for clamping action of the clamp in a radial direction. The spring 202 extends to the lower end of the clamp 206 and is secured thereto by a headed screw 208 which is threaded into the adjacent portion 209 of the clamp 206 and passes freely through an aperture in the outer portion of the clamp and knurled nut 210 is threaded onto the outwardly extending portion of the headed screw 208 and serves to provide the clamping action.

An aligning stud 211 is also provided on the clamp 206 and projects through a registering aperture in the leaf spring 202 thereby providing for accurately maintaining the clamp in a definite relation to spring 202. To move the clamp 206 outwardly a thumb screw 212 is threaded through the shouldered sleeve 207 and abuts a groove on the adjacent side of the tubular center support 200 whereby rotation of the screw 212 provides for radial adjustment, the leaf springs 202, 203 normally urging the clamp toward the tubular center support 200.

Mounted in the clamp 206 is a slightly angled cartridge holder 213 which has split shank 214 of cylindrical outer conformation with the split shank adapted to straddle the clamping screw 208 thereby preventing relative rotation, the cartridge holder being clamped in position by the clamping action of thumb screw 210. The opposite or cartridge holding end of the cartridge holder is provided with a bore 216 split as indicated at 215 with the bore arranged at an angle to the shank of the cartridge holder so that in normal scribing a cartridge 217 and the scribing element 218 therein will be inclined in the direction of movement as the compass is rotated clockwise as viewed from above at an angle of 90°—w. to the plane of the scribe coat surface 219. It will be noted that the cartridge 217 is generally cylindrical in outside configuration with the lower end being conically tapered and the cartridge is slidable in the bore 216. The cartridge 217 is provided with a bore which includes intermediate bore 220 which snugly and slidably receives the scribing element 218 with a reduced bore or at the lower end and an enlarged internally threaded bore 221 at the upper end and an externally threaded cap 222 closes the upper end of the cartridge bore and retains a spring 223 positioned between the cap 222 and the adjacent end of the scribing element 218 urging the scribing element to the projected position shown in FIGURE 20 while permitting the scribing element 218 to move against the bias of the compression spring 223 to provide a substantially uniform scribing force on the scribing point 224 at the free end of the small diameter portion of the scribe element 218. The position of the cartridge 217 in cartridge holder 213 is suitably adjusted the thumb screw 225 passing freely through one split portion of the cartridge support threaded into the other split portion produces a clamping action retaining the cartridge 217 in any adjusted position. It will also be noted in FIGURE 23 that the split cartridge receiving portion of the cartridge support 213 in a plane at right angles to the plane shown in FIGURE 20 shows that the cartridge receiving bore 216 and scribing element 218 are arranged at an angle $a$ to the split shank 214 and the scribing element 218 lies in a plane generally perpendicular to a radius line perpendicular to the axis of the center support 200.

A drop center shaft 226 similar to drop center shaft 63 previously described is slidably mounted in the tubular center support 200 and is manipulated by the knob 227 at the top, the downward movement being limited by an adjustable collar 228 while upward movement is limited by a collar similar to the collar 67 previously described engaging the threaded bushing 229 threaded into the top of tubular center 200 reacting against the collar to limit the axial movement of the drop center 226. It will be noted that the drop center 226 has a portion of reduced cylindrical shape 73 and a surface contact point 64 at the free end thereof.

The other radial extending arm of the double arm compass is made substantially similar and the parts thereof are indentified by the same reference numerals with a suffix F to indicate fixed scribing element. However, there is a difference in the angle B (FIGURE 23) of the scribing element 218F being substantially greater than angle A of the spring pressed scribing element 218 so that the scribing point 224F can be located substantially closer to the drop center point 64 to provide for scribing a very small circle. Also, the scribing element 218 is mounted in fixed relation by means of a cylindrical rod 232 which reacts between the cap 222F and the scribing element 218F.

With reference to FIGURE 22 it will be noted that the arrangement and dimensions of the parts provide for engagement of the full diameter portion 226 of the drop center with the other split portion 233 of the cartridge holder and also by the engagement of the lower conical portion 234 of the drop center tubular support 200 with the said other split portion 233 of the cartridge holder and the lower end of the large diameter portion of the drop center 226 may engage the lower conical portion 235F of the cartridge holder 217F thereby preventing physical contact between the center point 64 and the scribing point 224F avoiding damage and breakage of the parts while permitting the scribing point 224F to be as close as possible to the axis of the drop center 226 as illustrated in FIGURES 17 and 22. The adjustment of scribing point 224F is such that it lies in a plane including the axis of drop center 226 and is movable in such plane during any radial adjustment thereof so that the smallest circle can be scribed without physical contact of scribing point 224F with center 226. Even though cartridge 317F is improperly adjusted and extended excessively the scribing point of 224F cannot contact the drop center.

It is believed that the operation of the double armed scribing compass of FIGURES 16-24 should be obvious and it will be apparent that the drop center 226 is arranged to extend beyond a plane perpendicular to the center axis and located beyond the scribing points 224 and 224F. The center point 64 thereof is placed on the scribing surface 219 and the tubular center support 200 with the scribing points 224, 224F are moved downwardly until both scribing points engage the scribing surface 219. Upon a single rotation of the double armed scribing device concentric circles are formed and the scribing point 224F engaging the scribing surface 219 determines the extent of axial movement of the radial arms with the scribing points toward the scribing surface 219 while the spring pressed scribing point 224 may be pushed upwardly against the compression spring 223 to scribe on the scribing surface 219 simultaneously with fixed scribing point 224F. This also permits satisfactory scribing even though the center 226 is not held perpendicular to the scribing surface 219. If the pressure on resiliently pressed scribing point 224 is insufficient, the cartridge 217 may be slid downwardly in its holder to thereby cause the point 224 to engage scribing surface 219 while fixed scribing point 224F is substantially above the scribing surface 219 to increase the force of the pressure on scribing point 224 on the scribing surface 219. If the scribing force on resiliently pressed scribing point 224 is too great, such force may be reduced by retracting the cartridge 217 into the cartridge holder 213.

It will be noted that the double armed scribing device is normally rotated in a clockwise direction as viewed from the above causing the scribing points to be pulled or dragged thereby avoiding any detent action which might result from pushing of the scribing points on the scribing surface 219 as a result of counter-clockwise rotation; also the threads of bushing 229 are right hand threads to permit the flange thereof to be used in clockwise rotation. It will also be evident that the radius between the axis of drop center 226 and the fixed scribing point 224F will be constant because of the fixed mounting of the scribing point 224F. It will also be apparent that the scribing point 224 is movable along its length in its cartridge 217 but that the plane of operation of the scribing element 218 and point 224 is so close to a plane perpendicular to a radius perpendicular to the axis of drop center 226 that variations due to the movement of the scribing point into the cartridge do not materially change the effective scribing radius of scribing point 224 for any selected adjustment.

Upon reference to FIGURES 25–37 inclusive a modified form of scribing device comprises a first or main L-shaped body 240 hingedly connected to a second L-shaped body 241 by means of a pivot pin 242 having an integral guiding stud 243 projecting axially therefrom and such pin 242 passes through bottom and top knuckles 243, 244 of the L-shaped body 240 and through a knuckle 245 in the second L-shaped body 241. The hinge connection is such that the other legs 246 and 247 of the bodies remain in parallel relation during all hinging movements. The bodies are urged together by the action of compression spring 248 received in a longitudinal bore in the first leg of the first L-shaped body 240 urges a cylindrical stud 249 slidably mounted in the same bore against an abutment surface 250 on the single knuckle 245 of the other body 241. The bodies are separated by the action of a thumb screw 251 threaded into the first leg of the second L-shaped body 241 and engaging the adjacent surface of the first L-shaped body 240, a locking spring 252 surrounding the thumb screw 251 and engaging the head thereof and the L-shaped body 241 to maintain any desired adjustment. The vertical or other legs 246 and 247 are provided with scribing element receiving bases 246A, 247A respectively which have the lower portion of reduced diameter and such bores snugly and slidably receive scribing elements 218 previously described. The scribing elements 218 are urged to projected position by a leaf spring having an apertured mounting portion 246C secured by pivot pin 242 and a nut 242 A in operative secured by pivot pin 242 and a nut 242A in operative and 247D which engage the upper ends of scribing elements 218 urging the scribing points 224 thereof into operative relation to a surface 219 to be scribed. It will be noted that the inner surfaces of L-shaped bodies 240 and 241 are provided with semi-cylindrical recesses receiving a shouldered tubular mounting shank 253 secured by welding, soldering or the like in the semi-circular recess of body 246. Within the shouldered tubular mounting shank 253 is a shouldered shaft 254 with its shoulder 255 engaging the upper end of the shouldered tubular mounting shank 253 the lower threaded end receiving a nut 256 secured thereto and abutting the bottom shoulder of the shaft 254 permitting rotative movement of shaft 254 within the shouldered tubular mounting shank 253.

The scribing instrument may be secured to a lead holder 257 of conventional design which may clamp the reduced upper shank portion of the rotative shaft 254 as shown in FIGURE 26 permitting relative rotation of the scribing device with respect to the lead holder. The lead holder 257 may be clamped on the tubular shank 253 to maintain a fixed relation of the scribing device with respect to the lead holder 257 serving as the handle. The swivel mounting is particularly useful in cooperation with a curved guiding edge such as that shown at 258 in FIGURE 26. The stationary mounting is particularly useful with a straight guiding edge 259 as shown in FIGURE 27.

To assure proper reaction and force on the scribing elements in the bodies the biases of leaf spring portions 246D, 247D are controlled by adjusting screws 246E and 247E provided on the L-shaped bodies 246, 247 respectively to engage the leaf spring portions 246D and 247D respectively in a manner similar to that previously described with respect to the instrument shown in FIGURES 1–4, the adjustment being accomplished by a screw slot or an Allen head socket in the lower ends of the screws.

The large diameter portions of the scribe elements 218 sometimes vary in length and to take care of such variation, the cylindrical abutment rod 232 shown in FIG 19 is replaced by a strong compression spring which provides for small variations and takes up any irregularity between cap 220F and the large end of the scribing element 218F so that the shoulder on the end of the large diameter portion of scribe element 218F will remain snug against the shoulder on the cartridge 217F. It will be evident that the spring substituted for the rod 232 is a much stronger spring than the compression coil spring for the spring pressed scribe element 218. Considerable variation can be accommodated for by the various adjustments of the cartridge holders so that the point 224F will be accurately located. Small variations in the length of the large diameter portion of the scribing element 218 does not appreciably affect the operation of the scribing device shown in FIGURES 25–36 inclusive. The modification of the invention shown in FIGS. 25–36 is also adaptable for mounting in a drop center compass such as that shown in FIG. 28 which includes a drop center shaft 63 having a collar 66 adjustably mounted thereon, the drop center shaft 63 and point 64 being raised or lowered by the knob 65 and is substantially the same type drop center compass shown in FIG. 5.

An adapter shown in FIG. 30 includes a split shank 270 which is received in the clamp 83 of the drop center compass which is controlled by screw 87 and at the lower end of the split shank 270 a member 271 is provided with a reduced bore which receives a reduced end 272 of the shank 270 and is fixed thereto by soldering or the like. The body 270 is provided with a slit 273 extending from an enlarged bore 274 adjacent the end connected to the split shank 270 to the other end of the body and a machine screw 275 is threaded into a screw threaded bore in one section and the two sections formed by the slit 273 and passing freely through an aligned bore in the other section. The sections are drawn together by rotation of the nut 276 on screw 275 engaging the adjacent section. The end of the body 271 opposite the mounting shank 270 is provided with a bore 277 of a size to snugly grip the tubular shank 253 of the first L-shaped scribe body 240 whereby the scribing device shown in FIGS. 25–36 can be mounted to simultaneously scribe two arcs such as the arcs shown in FIG. 37. It will be noted that the mounting shank 270 is spaced from the axis of the split bore 276 the same distance as the spacing between the axis of mounting shank 254 and the scribing pin 218 on the L-shaped body 240 and it will be apparent that the portions of the scribing elements 218 supported on the L-shaped bodies 240 and 241 can be arranged in a radial direction from the center 64 to make two arcs tangent with parallel lines 280, 281, 280A, 281A simultaneously on a scribe coated material 219 shown in FIG. 37.

It will thus be seen that the scribing device shown in FIGS. 25–36 inclusive may be used to draw parallel lines of straight or irregular curves by mounting in a lead holder as shown in FIGS. 26 and 27 or the same device may be mounted in a drop center compass by the adapter 270, 271 to simultaneously draw two parallel lines although the adjustment may have to be varied in the spacing between the scribing points 218 of the scribing device for drawing arcuate lines after having drawn straight lines, this adjustment being simply accomplished by the adjusting screw 251 with a minimum time and effort.

It will be apparent that various changes may be made within the spirit and scope of the invention within the valid interpretation of the claims.

What is claimed is:

1. A device for cutting one side of a laminated material to permit stripping of the portion of the ply between cuts, comprising a cross-shaped body of transparent material, legs extending downwardly from the stem and arms of the body the foot ends of the legs providing for guidance over a surface and defining a reference plane, an externally threaded tubular guide perpendicular to said reference plane mounted adjacent the end of the head of the body, a shaft extending through said tubular guide, a first mounting plate including the axis of said shaft fixed to the lower end of said tubular guide, a second mounting plate transverse to and fixed to said shaft and first plate, a compression spring surrounding the upper end of said shaft engaging the upper end of said tubular guide and a shoulder on said shaft for urging said shaft upwardly, a cap threaded on said tubular guide for engagement with the upper end of said shaft for limiting the upward movement of said shaft, a pivot pin spaced laterally of the axis of said shaft and downwardly of said second plate and extending perpendicularly through and fixed to said first plate, a leaf spring mounted on the end of said second plate adjacent said pivot pin, said leaf spring having a leaf portion positioned with clearance on each side of said shaft, a sofa-shaped cutter positioned on each side of said first plate, each sofa-shaped cutter having a foot leg and a head portion above said head leg, each sofa-shaped cutter being mounted on said pivot pin adjacent the foot leg of the sofa-shaped cutter and between the foot and head legs thereof, the head portion of each sofa-shaped cutter extending above the upper surface of the second plate and engaging the associated leaf portion of the spring, the foot end portion of each cutter being engageable with the under surface of the second plate for limiting the rotational movement caused by said leaf spring about said pivot, the head leg of each cutter being chisel sharpened with the bevel of the head leg adjacent one head of the other, the foot leg of each cutter being smoothly rounded to prevent damage to a surface, said device forming parallel slits in a surface, the cap adjustment providing for control of the depth of the slits.

2. The invention according to claim 1 in which spacers are provided between each cutter and said second plate to obtain proper spacing of the cutting edges, and collars are provided to retain the cutters and spacers in position.

3. A cutting device comprising a body, means to support the body at three points defining a reference plane, a scribing device mounted for pivotal movement about an axis perpendicular to the reference plane, a scribing element pivotally mounted on said scribing device on an axis parallel with said reference plane and transverse to said perpendicular axis and spaced therefrom, said scribing element having a pair of legs mounted with one leg on one side of the perpendicular axis and the other leg on the other side of the perpendicular axis, one leg of the scribing element defining the scribing point being located on the opposite side of said perpendicular axis from said axis parallel to said reference plane whereby said legs of the scribing device may engage a straight or curved edge for guide movement along a surface while being adapted to be drawn to produce tangent curves in changing directions.

4. The invention according to claim 3 in which means are provided to bias said one leg toward and through said reference plane.

5. The invention according to claim 4 in which a scribing element is mounted on opposite sides of said perpendicular axis spaced apart in the direction of said parallel axis.

6. A device for simultaneously scribe cutting at least two parallel lines comprising a chassis, three nonaligned feet on said chassis supporting the body thereof on a supporting surface and defining a reference plane, a shaft rotatably mounted on said chassis and extending perpendicularly to said reference plane formed by said feet, a scriber cutter mounting member on said shaft, at least two scriber cutters having their scribing cutting portions offset from the axis of said shaft, each scriber cutter being rockably mounted on said scriber cutter mounting member, adjustable yieldable means independently urging each scribing cutting portion of each scriber cutter beyond the reference plane defined by said feet so that a desired pressure will be maintained continuously between the scribing cutting portion of each scriber cutter and the supporting surface which the feet engage when the operator maintains the device in scribing position with the three feet engaging the supporting surface.

7. The invention according to claim 6 in which the scriber cutter mounting means includes a plate mounted on said shaft with the plane of the plate including the shaft axis, a pivot pin extending transversely to said plate and projecting from both sides thereof, each scriber cutter being of plate-like shape and rockably mounted on said pivot pin, and means reacting from said scriber cutter mounting means urging the scriber cutters into work support engaging position.

8. The invention according to claim 6 in which the scriber cutter mounting means includes means limiting the movement of the scriber cutters away from the chassis.

9. The invention according to claim 6 in which the scriber cutter mounting means includes a first plate having its plane include the axis of the shaft, and a second plate transversely to the shaft axis and transversely to the first plate, a pivot pin extending transversely to said shaft axis and transversely to said first plane and mounted in said first plate with the pin being offset from the axis in one direction, a sofa shaped cutter pivotally mounted on said pin on each side of said first plate, a leaf spring mounted on said second plate adjacent the pivot pin and on the side of the axis of said pivot pin and adjacent the foot end of the sofa shaped cutter and having portions projecting beyond the head end of the second plate and engaging the heads of the sofa-shaped cutters and screw means to vary the force of application of the portions of said spring against the heads of the sofa shaped cutter whereby the pressure of the scribing cutting portions can be accurately controlled.

10. The invention according to claim 6 in which a tubular guide is mounted on the chassis and receives the shaft and the shaft projects above the tubular guide and is threaded at its upper end, a retaining cap on the threaded upper end of said shaft, a spring reacting between said shaft and the upper end of the tubular guide to normally urge the shaft upwardly, a stop cap adjustably mounted on said tubular guide and having an abutment for engaging the retaining cap whereby the vertical position of the shaft is positively controlled.

References Cited by the Examiner

UNITED STATES PATENTS

| | | | |
|---|---|---|---|
| 30,722 | 11/60 | Collman et al. | 33—164.9 X |
| 1,181,921 | 5/16 | Paddack | 33—41 |
| 1,191,725 | 7/16 | Paulsen | 33—41 |
| 1,970,476 | 8/34 | Schutze | 33—41 |
| 2,394,452 | 2/46 | Howard | 33—41 |
| 2,782,501 | 2/57 | Adams | 33—41 X |
| 2,810,960 | 10/57 | Johnson et al. | 33—18 X |

FOREIGN PATENTS 344,121   3/31   Great Britain.

ISAAC LISANN, *Primary Examiner.*
ROBERT L. EVANS, *Examiner.*